US010129413B2

(12) United States Patent
Seuken et al.

(10) Patent No.: US 10,129,413 B2
(45) Date of Patent: *Nov. 13, 2018

(54) SYSTEMS AND METHODS FOR ALLOCATING AND PRICING ALTERNATIVE NETWORK ACCESS RESOURCES WITH RESERVE PRICES

(71) Applicant: BANDWIDTHX INC., Carlsbad, CA (US)

(72) Inventors: Sven Seuken, Zurich (CH); Pertti Juhani Visuri, Carlsbad, CA (US); Johanna Katariina Visuri, Carlsbad, CA (US); Dan Zagursky, San Diego, CA (US)

(73) Assignee: BANDWIDTHX INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,878

(22) Filed: Jan. 16, 2018

(65) Prior Publication Data
US 2018/0146100 A1    May 24, 2018

Related U.S. Application Data

(63) Continuation of application No. 15/691,566, filed on Aug. 30, 2017, now Pat. No. 9,900,445, which is a
(Continued)

(51) Int. Cl.
*H04M 11/00* (2006.01)
*H04M 15/00* (2006.01)
(Continued)

(52) U.S. Cl.
CPC .......... *H04M 15/80* (2013.01); *H04L 12/145* (2013.01); *H04M 15/49* (2013.01);
(Continued)

(58) Field of Classification Search
CPC ...... H04M 15/80; H04M 16/00; H04M 15/49; H04M 15/50; H04W 36/14; H04W 36/22;
(Continued)

(56) References Cited

U.S. PATENT DOCUMENTS 5,426,674 A    6/1995    Nemirovsky et al.
6,396,816 B1   5/2002    Astle et al.
(Continued)

FOREIGN PATENT DOCUMENTS

| WO | 2006126062 A2 | 11/2006 |
| WO | 2013044958 A1 | 4/2013 |
| WO | 2015/014413 A1 | 2/2015 |

OTHER PUBLICATIONS

European Search Report dated Nov. 3, 2017 for related EP Patent Application No. 14876771.8.
(Continued)

*Primary Examiner* — Barry W Taylor
(74) *Attorney, Agent, or Firm* — Procopio, Cory, Hargreaves & Savitch LLP

(57) ABSTRACT

A method for allocating and pricing access to alternative access networks may include: inputting, by one or more parties, needs for alternative network access and representative values for satisfying the needs; setting, by providers of alternative network access, reserve prices for access to each of access point in the alternative network; generating a solution based on a mixed integer program to maximize value created by allocation of alternative network access; and allocating alternative network access to the one or more parties based on the mixed integer program solution.

15 Claims, 3 Drawing Sheets

Related U.S. Application Data continuation of application No. 14/587,662, filed on Dec. 31, 2014, now Pat. No. 9,781,277.

(60) Provisional application No. 61/922,382, filed on Dec. 31, 2013, provisional application No. 61/922,396, filed on Dec. 31, 2013, provisional application No. 61/922,376, filed on Dec. 31, 2013.

(51) Int. Cl.

| | | |
|---|---|---|
| *H04L 12/14* | (2006.01) | |
| *H04W 36/22* | (2009.01) | |
| *H04W 36/14* | (2009.01) | |
| *H04W 16/00* | (2009.01) | |
| *H04W 36/30* | (2009.01) | |
| *H04W 36/32* | (2009.01) | |
| *H04L 12/24* | (2006.01) | |
| *H04W 48/18* | (2009.01) | |
| *H04W 84/12* | (2009.01) | |
| *H04W 88/06* | (2009.01) | |
| *H04W 76/16* | (2018.01) | |

(52) U.S. Cl.
CPC ....... *H04M 15/785* (2013.01); *H04M 15/805* (2013.01); *H04W 16/00* (2013.01); *H04W 36/14* (2013.01); *H04W 36/22* (2013.01); *H04W 36/30* (2013.01); *H04W 36/32* (2013.01); *H04L 41/0896* (2013.01); *H04M 15/50* (2013.01); *H04W 48/18* (2013.01); *H04W 76/16* (2018.02); *H04W 84/12* (2013.01); *H04W 88/06* (2013.01)

(58) Field of Classification Search
CPC ... H04W 48/18; H04L 12/145; H04L 41/0896
See application file for complete search history.

(56) References Cited

U.S. PATENT DOCUMENTS

| | | | |
|---|---|---|---|
| 7,043,225 B1 * | 5/2006 | Patel | ...................... H04L 12/14 455/404.2 |
| 8,743,696 B2 | 6/2014 | Chowdhury | |
| 8,750,123 B1 | 6/2014 | Alisawi | |
| 9,001,787 B1 | 4/2015 | Conant et al. | |
| 9,110,661 B2 | 8/2015 | Lynar et al. | |
| 9,125,055 B1 | 9/2015 | Jones et al. | |
| 9,232,434 B2 | 1/2016 | Rong et al. | |
| 9,325,621 B1 | 4/2016 | Ramamurthy et al. | |
| 9,532,269 B2 | 12/2016 | Hong et al. | |
| 2001/0032262 A1 | 10/2001 | Sundqvist et al. | |
| 2004/0165605 A1 | 8/2004 | Nassar | |
| 2004/0168088 A1 | 8/2004 | Guo et al. | |
| 2005/0018686 A1 | 1/2005 | Igarashi et al. | |
| 2005/0243778 A1 | 11/2005 | Wang et al. | |
| 2005/0278262 A1 | 12/2005 | Cheliotis et al. | |
| 2006/0031444 A1 | 2/2006 | Drew et al. | |
| 2006/0073840 A1 | 4/2006 | Akgun et al. | |
| 2006/0167784 A1 | 7/2006 | Hoffberg | |
| 2007/0011080 A1 | 1/2007 | Jain et al. | |
| 2008/0015914 A1 | 1/2008 | Jacobs et al. | |
| 2008/0062933 A1 | 3/2008 | Liu et al. | |
| 2008/0279147 A1 | 11/2008 | Hassan et al. | |
| 2009/0207824 A1 | 8/2009 | Lee et al. | |
| 2009/0292629 A1 | 11/2009 | Lynch et al. | |
| 2010/0145161 A1 | 6/2010 | Niyato et al. | |
| 2011/0029675 A1 | 2/2011 | Yeow et al. | |
| 2011/0237202 A1 | 9/2011 | Uemura et al. | |
| 2011/0286437 A1 | 11/2011 | Austin et al. | |
| 2011/0294539 A1 | 12/2011 | Shin et al. | |
| 2011/0320588 A1 | 12/2011 | Raleigh | |
| 2012/0014332 A1 | 1/2012 | Smith et al. | |
| 2012/0142382 A1 | 6/2012 | Stanforth et al. | |
| 2012/0230191 A1 | 9/2012 | Fang | |
| 2012/0238287 A1 | 9/2012 | Scherzer | |
| 2012/0303788 A1 | 11/2012 | Heinrich et al. | |
| 2012/0303829 A1 | 11/2012 | LaFrance | |
| 2013/0070594 A1 | 3/2013 | Garcia Martin et al. | |
| 2013/0081121 A1 | 3/2013 | Green et al. | |
| 2013/0089056 A1 | 4/2013 | Iwai et al. | |
| 2013/0152168 A1 | 6/2013 | Nasir et al. | |
| 2013/0176952 A1 | 7/2013 | Shin et al. | |
| 2013/0301609 A1 | 11/2013 | Smith et al. | |
| 2013/0311778 A1 | 11/2013 | Cherukuri et al. | |
| 2013/0322329 A1 | 12/2013 | Visuri et al. | |
| 2013/0322401 A1 | 12/2013 | Visuri et al. | |
| 2013/0324104 A1 | 12/2013 | Cavilla et al. | |
| 2014/0031029 A1 | 1/2014 | Rajagopalan et al. | |
| 2014/0036691 A1 | 2/2014 | Madan et al. | |
| 2014/0086211 A1 * | 3/2014 | Liu | ................ H04L 45/38 370/331 |
| 2014/0220993 A1 | 8/2014 | Cordeiro et al. | |
| 2014/0295825 A1 | 10/2014 | Chuang et al. | |
| 2014/0341109 A1 | 11/2014 | Cartmell et al. | |
| 2015/0215816 A1 | 7/2015 | Abou-Elkheir et al. | |
| 2015/0365887 A1 | 12/2015 | Tong et al. | |
| 2016/0165478 A1 | 6/2016 | Yao | |
| 2016/0183139 A1 * | 6/2016 | Meredith | ............... H04W 36/14 455/432.1 |
| 2016/0227471 A1 | 8/2016 | De Foy et al. | |
| 2016/0295412 A1 | 10/2016 | Peterson et al. | |
| 2017/0078929 A1 * | 3/2017 | Li | ......................... H04W 48/20 |
| 2017/0272995 A1 * | 9/2017 | Kim | ..................... H04W 36/22 |

OTHER PUBLICATIONS

European Search Report dated Oct. 27, 2017 for related EP Patent Application No. 14876245.3.
International Search Report and Written Opinion for related international application No. PCT/US2016/054434, dated Jan. 24, 2017.
International Search Report and Written Opinion for related PCT Application No. PCT/US2014/072863, dated Apr. 24, 2015.
International Search Report and Written Opinion for related PCT Application No. PCT/US2014/072864, dated Apr. 13, 2015.
International Search Report and Written Opinion for related PCT Application No. PCT/US2014/073000 dated Apr. 21, 2015.

* cited by examiner

SYSTEMS AND METHODS FOR ALLOCATING AND PRICING ALTERNATIVE NETWORK ACCESS RESOURCES WITH RESERVE PRICES

CROSS-REFERENCE TO RELATED APPLICATIONS

This application is a continuation of U.S. patent application Ser. No. 15/691,566, filed on Aug. 30, 2017, which is a continuation of U.S. patent application Ser. No. 14/587,662, filed on Dec. 31, 2014, which claims the benefit of U.S. Provisional Patent App. No. 61/922,396, filed on Dec. 31, 2013, U.S. Provisional Patent App. No. 61/922,382, filed on Dec. 31, 2013, and U.S. Provisional Patent App. No. 61/922,376, filed on Dec. 31, 2013, the disclosures of all of which are hereby incorporated herein by reference as if set forth in their entireties.

BACKGROUND

Field

The subject matter discussed herein relates generally to wireless service to mobile devices and, more particularly, to allocation of resources on alternative radio access networks that can be used to service mobile devices in situations in which the alternative network access providers wish to set minimum acceptable prices for network access.

Introduction

Mobile devices generally rely on wireless service provided by a service provider using cellular communications that utilize radio frequency communication.

Data communications to mobile devices can also be provided over other types of radio access networks. For example, Wi-Fi access points connected to broadband networks provide data to mobile devices. The choice of whether data communication takes place over a cellular network or a Wi-Fi connection is normally left to the end user of the device. If the end user has entered all necessary passwords and access credentials to the mobile device memory and the Wi-Fi radio is on, in many cases the connection to Wi-Fi is preferred automatically by the mobile device.

In U.S. patent application Ser. No. 13/684,044 (filed Nov. 21, 2012), Ser. No. 13/684,048 (filed Nov. 21, 2012), Ser. No. 13/684,049 (filed Nov. 21, 2012), 61/805,473 (filed Mar. 26, 2012), 61/805,476 (filed Mar. 26, 2012) and 61/877,178 (filed Sep. 12, 2013) methods are described for alternative network access (ANA) based on methods and systems for selecting the radio access network to provide Internet or other network access based on terms and conditions for allowing access and terms and conditions for utilizing access to the alternative network. Each of those applications is hereby incorporated by reference in their entirety.

In practice, the terms and conditions for utilizing access to alternative networks often depend on the expected or the actual load on the primary network managed by the service provider for the device. For example, if the primary network access takes place through the cellular network system owned by the service provider for the device, it is likely that the service provider first wants to utilize all of the capacity in its own network before seeking to use capacity from an alternative network. This is especially the case if there is a cost associated with using the alternative network access.

In provisional patent application titled SYSTEMS AND METHODS FOR MANAGING OFFLOAD FROM ONE RADIO ACCESS NETWORK TO ANOTHER filed concurrently herewith, systems and methods are described to manage offload of traffic to a system of alternative network access points based on and offload profile established by mutual agreement between the primary mobile network operator and the provider of alternative network access. That application is incorporated herein by reference in its entirety.

In provisional patent application titled SYSTEMS AND METHODS FOR ALLOCATING ALTERNATIVE NETWORK ACCESS RESOURCES filed concurrently herewith, a method is described to allocate access to access points for alternative network access when several mobile operators and alternative access providers are involved. That application is incorporated herein by reference in its entirety.

This application describes a methodology for utilizing reserve prices for allocating and pricing access to resources represented by the access points of the alternative network access provider or several providers in a situation where one or more mobile network operators and zero or more other parties interested in access to the same resources through the same access management system and the alternative network access providers wish to set a minimum price for their resources.

BRIEF DESCRIPTION OF THE DRAWINGS

Aspects and features of the present inventive concept will be more apparent by describing example embodiments with reference to the accompanying drawings, in which.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for establishing wireless connections based on access conditions. Other features and advantages of the subject matter should be apparent from the following description.

As communication needs of various wireless and mobile devices have grown, many of them have been equipped with more than one radio system. Each of the radio systems may be used to connect to one or more wireless networks based on the system protocols. Examples of such systems are a cellular radio system that may be utilizing a GSM, CDMA or the LTE standard for encoding the signal and a Wi-Fi system that utilizes a well-known IEEE 802.11 standard for communication. Another example would be a WiMAX system that is based on the IEEE standard 802.16.

Figure 1:
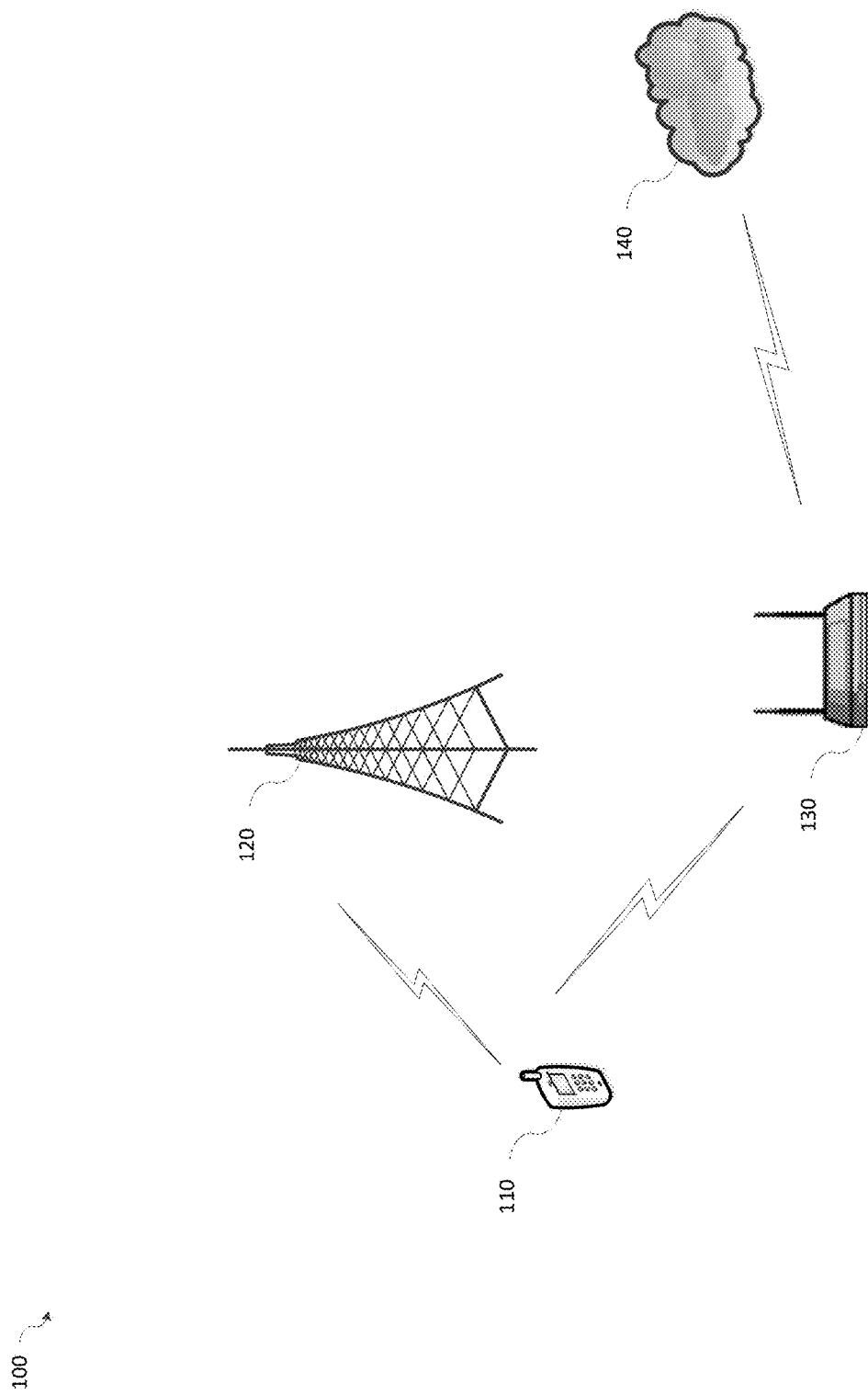
FIG. 1 is a block diagram illustrating a cellular network and an alternative access network according to various embodiments.

FIG. 1 is a block diagram 100 illustrating a cellular network and an alternative access network according to various embodiments. Referring to FIG. 1, a mobile device 110 may communicate with a cellular network 120. The mobile device 110 may also be configured to communicate with an alternative access network 140 through an access point 130.

In a communication device that has multiple radio systems each of the radios may have different characteristics. For example, the cellular system may be designed to connect to cell towers that are further apart and use a higher power signal than the Wi-Fi radio system uses. Since the Wi-Fi standard is utilizing unlicensed spectrum, the power of the transmitter may be limited by regulation and consequently the distance over which the communication can effectively take place in is typically shorter than the distance in the case of a cellular connection.

The different characteristic of the radio systems result in a topology of coverage in the environment that is very different for each radio access network. For example, in the cellular system a single radio may be covering an area ranging from hundreds of meters across to a few kilometers, with typically one square kilometer or more of surface area for a cellular sector. In comparison, a Wi-Fi system that is based on using unlicensed radio bands and therefore limited in the power of the signal, typically only covers an area of 50 meters to 100 meters across.

The end result of the relatively high penetration of broadband access, high prevalence of Wi-Fi access points as the termination points on broadband connections and the sparse and intermittent use of these Internet connections is that there is tremendous unused wireless network access capacity available in most urban and suburban areas. This capacity is owned and controlled by broadband service providers. In most cases these are different companies than the mobile network operators. Therefore in most cases the access points are not available for alternative network access to the mobile devices that primarily use cellular networks for accessing the Internet.

Figure 2:
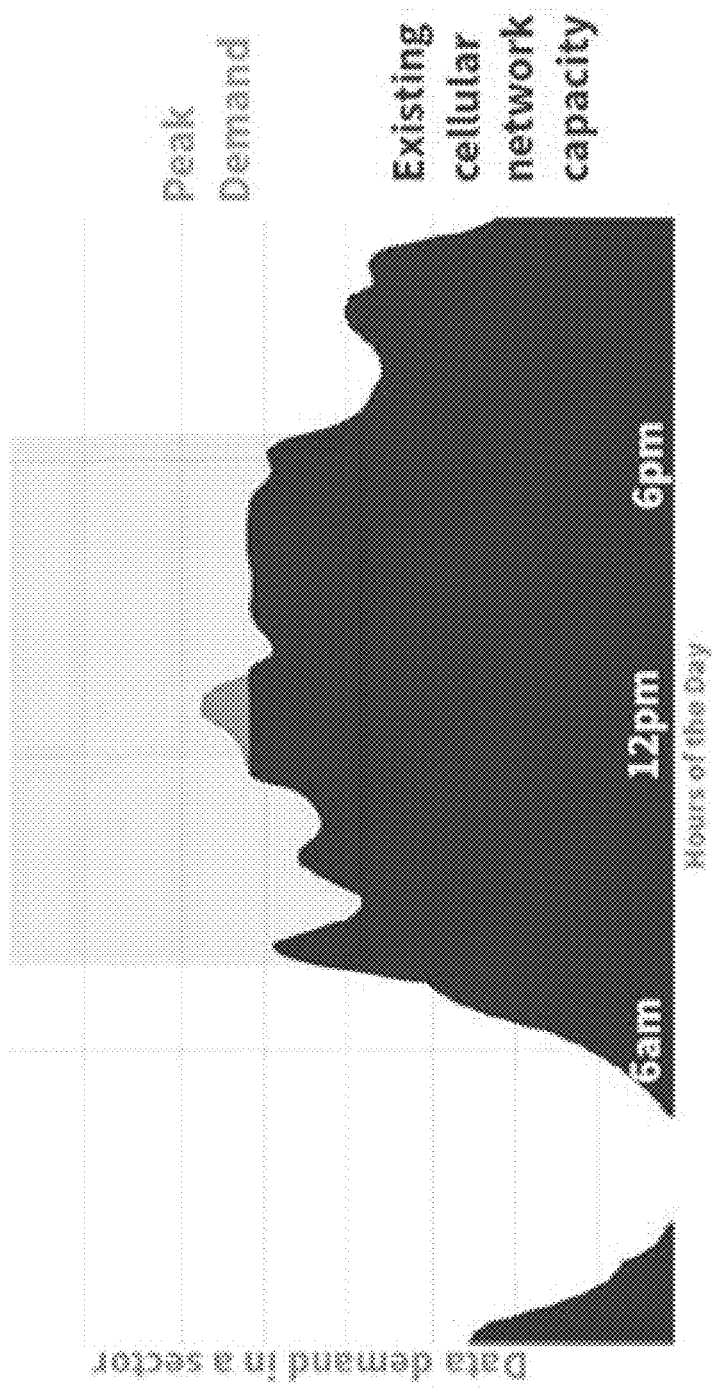
FIG. 2 is a graph illustrating a typical variation of data usage during the hours of a business day in a downtown business district and an example of such peak demand exceeding the cellular network capacity.

As the overall usage of data by mobile devices continues to grow, more devices, connected to a particular cell sector radio will attempt to use more data at higher frequencies. Over time this means that the maximum capacity of data traffic at the cellular radio will be reached. Initially this typically happens only during peak usage times. These peak times are typically very regular and occur during business days during the same hours every day. The actual pattern of usage may be different at different locations. For example, in downtown business districts the peak usage takes place during the morning and evening commute hours and during lunchtime. In suburban residential areas the highest usage normally occurs during the evening hours. FIG. 2 is a graph illustrating a typical variation of data usage during the hours of a business day in a downtown business district and an example of such peak demand exceeding the cellular network capacity.

Since the mobile network operators occasionally in some locations need additional capacity and broadband network operators with Wi-Fi access to the network often have capacity that is not being used, it makes sense for the broadband network operators to become providers of alternative network access to the mobile network operators. However, allocating the resources of these alternative network access points to possibly several mobile network operators that may wish to use them at the same time is not a trivial problem.

A method of using mixed integer programming to allocate access based on values provided by the buyers of access, mobile network operators (MNOs), mobile virtual network operators (MVNOs) and other parties interested in access to the alternative networks was explained in patent application titled SYSTEMS AND METHODS FOR ALLOCATING ALTERNATIVE NETWORK ACCESS RESOURCES. The basic assumption in that method was that access to the alternative network access points was available regardless of what the values stated by the MNOs and other parties interested in the access were.

This application provides the solution for how to allocate the access (in the form of reservations) in case the various alternative access providers have established minimum prices for getting access to other resources, and how to compute prices for these reservations.

In the following the minimum price for capacity from a particular access point is called the reserve price. The reserve price can either be set individually for each access point and can be dependent on the time, or a seller can specify one "averaged" reserve price that needs to be met on average, but not at every access point at in each time slot. In the following example the allocation is done once a day for one hour time slots during a day. Obviously the same mechanism applies for any other frequency for allocating capacity and any other time resolution.

Reservation Mechanism Using Reserve Prices

In order to understand the constrains and allocation mechanism the following are the indices used in the equations that express the constraints:

Sets and Indices:

$i \in I$, indexing MNOs, and $i \in I'$, indexing MVNOs $j \in J$, indexing the sectors (individually per MNO/MVNO)

$s \in S$, indexing sellers $a \in A$, indexing APs $k \in K = \{0, 1, \ldots 23\}$, time slots in a day The following are the parameters and their units:

Parameters [Units]:

$D_{ijk}$ [Mbits/s], offloading demand from MNO/MVNO i in sector j for slot k;

$$D_{ij} = \sum_{k \in K} D_{ijk}$$

$S_{ak}$ [Mbits/s], (predicted) supply available at access point a in time slot k $$T_{ijak}\left[\frac{Mbits}{s}\right],$$

(Predicted) traffic from MNO/MVNO i in j "around" AP a in timeslot k (offloading potential)

$F_{ijk}$ [Mbits/s], capacity downwards tolerance ("fudge factor)" by MNO i in its sector j in time slot k $V_{ij}$ [$], value of MNO i for sector j for offloading all of its demand during the whole day in this sector $V_i'$ [$/GB], value of MVNO i for offloading 1 GB (in any sector at any time)

$R_{ak}$ [$/Mbits], reserve price from access point a for time slot k $R_s$ [$/Mbits], "average" reserve price from seller s for all of its APs and all time slots $B_{ijak}^T \in [0, 1]$, volatility buffer to "discount" the traffic from i in sector j in timeslot k around AP a $B_{ak}^S \in [0, 1]$, volatility buffer to "discount" the supply from access point a in timeslot turn italic $C \in [0, 1]$, commission (multiplied with clearing price, e.g., C=0.1)

L [seconds], length of one time slot (e.g., 3,600 seconds=1 hour)

The variables in the system and their units are:
Variables [Units]
$x_{ij} \in \{0,1\}$, does MNO i get reservation for sector j or not (modeling the combinatorial preferences)
$y_{ijk}$ [Mbits/s], traffic reservation for MNO/MVNO i for sector j in time slot k
$r_{ijak}$ [Mbits/s], traffic reservation at access point a for MNO/MVNO is sector j in time slot k
$r_{ijak}$ [Mbits/s], traffic reservation for MNO/MVNO is sector j in time slot k at all of seller s's APs The mixed integer programming MIP expression to be maximized is:

$$\max_{x,y,r} \underbrace{\sum_{i \in I} \sum_{j \in J} V_{ij} \cdot \frac{\sum_{k \in K} y_{ijk}}{D_{ij}}}_{\text{value created from MNOs}} + \underbrace{\sum_{i \in I'} \sum_{j \in J} \sum_{k \in K} V'_i \cdot \frac{y_{ijk} \cdot L}{8 \cdot 1,000}}_{\text{value created from MVNOs}} \quad \text{(MIP 1)}$$

The associated constraints are:

$y_{ijk} \leq x_{ij} \cdot D_{ijk}$ $\forall i \in I, j \in J, k \in K$ [only reserve sth, if allocated, and never more than demand] (2)

$y_{ijk} \geq x_{ij} \cdot (D_{ijk} - F_{ijk})$ $\forall i \in I, j \in J, k \in K$ [if allocated, then don't reserve too little] (3)

$y_{ijk} = \sum_a r_{ijak}$ $\forall i \in I \cup I', j \in J, k \in K$ [reserve as much as needed to satisfy demand] (4)

$r_{ijak} \leq T_{ijak} \cdot B_{ijak}^T$ $\forall i \in I \cup I', j, k, a$ [don't reserve more than available traffic around AP] (5)

$\sum_{i,j} r_{ijak} \leq S_{ak} \cdot B_{ak}^S$ $\forall a \in A, k \in K$ [don't reserve more at an AP than available supply] (6)

$$V_{ij} \cdot \frac{\sum_{k \in K} y_{ijk}}{D_{ij}} \geq \sum_{a \in A} \sum_{k \in K} \frac{R_{ak}}{(1-C)} \cdot \frac{r_{ijak} \cdot L}{8 \cdot 1000} \forall i \in I, j \in J \quad (7)$$

[MNOs: handle per-Ap-per-k reserves]

$$V'_i \cdot \frac{y_{ijk} \cdot L}{8 \cdot 1000} \geq \sum_{a \in A} \frac{R_{ak}}{(1-C)} \cdot \frac{r_{ijak} \cdot L}{8 \cdot 1000} \forall i \in I', j \in J, k \in K \quad (8)$$

[MVNO: handle per-Ap-per-k reserves]

$$V_{ij} \cdot \frac{\sum_{k \in K} y_{ijk}}{D_{ij}} \geq \sum_{s \in S} \frac{R_s}{(1-C)} \cdot \sum_{k \in K} \frac{r_{ijsk} \cdot L}{8 \cdot 1000} \forall i \in I, j \in J \quad (9)$$

[MNO: handle average reserve prices]

$$V'_i \cdot \frac{y_{ijk} \cdot L}{8 \cdot 1000} \geq \sum_{s \in S} \frac{R_{ak}}{(1-C)} \cdot \frac{r_{ijsk} \cdot L}{8 \cdot 1000} \forall i \in I', j \in J, k \in K \quad (10)$$

[MVNO: handle average reserves]

$r_{ijsk} = \sum_{a \in A(s)} r_{ijak}$ $\forall i \in I \cup I', j \in J, s \in S, k \in K$ [set the reservation variables consistently] (11)

The objective function: we maximize efficiency (i.e., social welfare), i.e., we maximize the total value created. Because MNOs and MVNOs report their value functions differently, we should treat them separately. In the first term, we sum over all MNOs i and all of their sectors j, and for each sector, we multiply their reported value $V_{ij}$ (in $) with the fraction of how much of their total demand they actually received (thus assuming a linear value relationship). In the second term, we sum over all MVNOs i, all their sectors j and all time slots k, and then multiply their value (in dollars per GB ($/GB)) with how much bandwidth they actually received (in GB). We multiply by L and divide by 8 and 1,000 to convert MBit/s into GB. The explanations for the constraints are the following:

Line (2): This and the following constraint handle the combinatorial preferences for the MNOs. Here, if MNO i does not get a reservation in sector j, then $x_{ijk}=0$, and thus, the amount of traffic reserved $y_{ijk}$ must also be 0. If i gets the reservation in sector j, then $x_{ijk}=1$, and then we make sure that we do not reserve more than the demand, i.e., $y_{ijk} \leq D_{ijk}$.

Line (3): This line handles the second part of the combinatorial constraint. If MNO i gets a reservation for sector j (i.e., $x_{ij}=1$), then we must reserve enough, i.e., at least its demand minus the maximal allowable capacity deviation, i.e., $y_{ijk} \geq D_{ijk} - F_{ijk}$.

Line (4): This constraint balances demand and supply. Every reservation that we promise some buyer (i.e., $y_{ijk}$) needs to be satisfied by the reservations made for this buyer at all APs (i.e., $\sum_a r_{ijak}$).

Line (5): This constraint makes sure we obey the traffic potential around the APs. Specifically, for every buyer i and its sector j for every timeslot k and every AP a, we cannot reserve more than there is potential traffic to be offloaded. On the right-hand-side, we multiply $T_{ijak}$, i.e., the potential traffic to be offloaded, with the volatility buffer $B_{ijak}^T \in [0,1]$ to account for the volatility of the traffic around the AP. If there is low volatility, then we will have a high value for $B_{ijak}^T$ close to 1.

Line (6): This constraint makes sure we obey the availability supply at each AP. More specifically, for each AP a and timeslot k, we make sure that the total amount of reservations for this AP and timeslot (i.e., $\sum_{i,j} r_{ijak}$) is less than or equal to the available supply. To get the available supply, we multiply (i.e., reduce, the supply parameter $S_{ak}$ with the volatility buffer $B_{ak}^T \in [0,1]$ to account for the volatility in supply at this AP in timeslot k (particularly important for amenity Wi-Fi).

Line (7): The next two constraints handle the per-Access Point-per-time-slot reservation prices of the sellers. This specific constraint handles this for the MNOs.

For each MNO i and each sector j, we make sure that the total value generated (i.e., the expression on the left-and-side) is at least as large as necessary to satisfy the reservation prices and the commission (i.e., the expression on the right-hand-side). You can verify that the expression on the left-hand-side is the same as the value of the MNOs in the objective of the function (i.e. a term measured in dollars).

On the right-hand-side, we sum over all APs and time slots, and then take each per-AP-per-time-slot reservation price $R_{ak}$ and divide it by (1−C) to account for the commission. For example, if the reservation price is $9, and C=0.1, then the resulting term is $10, i.e., effectively, we have increased the reservation price, because the $10 is the true minimum clearing price possible, such that we can still take a 10% commission and still have enough left to satisfy the seller's true reservation price (of $9). Once we have this "corrected" reservation price (in $/GB) we multiply it with the total amount of traffic reserved at this AP for this time slot. Because $r_{ijak}$ is measured in Mbits/s, we multiply it by L=3, 600 seconds, and divide by 8 and by 1,000 to get the total traffic in GB. This, multiplied by the reserve price (in $/GB), gives us a value measured in dollars as on the left-hand-side.

Line (8): This line handles the per-AP-per-time-slot reservation price constraint for the MVNOs. Again, the term on the left-hand-side is the realized value of the MVNO, and you can verify that it is the same expression as in the second term in the objective function. On the right-hand side, we have the same expression as in the line above, except that we do not sum over all time slots k, but instead we have a separate constraint individually for each time slot, because MVNOs do not have combinatorial preferences that span multiple time slots.

Line (9): The next two lines handle the "average" reservation prices of the sellers, i.e., the reservation prices do not need to hold per AP, or per buyer or per sector, but just on average over all the seller's APs. This line specifically handles this for the MNOs only. Still, the decision is whether to make a reservation for a buyer i in sector j or not. Thus, for each i and each j, we check, if the reservation-price constraint can be satisfied, i.e., we make sure that the value generated for this buyer in this sector is enough to satisfy the reservation prices in the commission (otherwise we cannot make a reservation for this buyer in this sector).

On the left-hand-side, as before, we simply have the value generated for the buyer, the same as in the first term in the objective function.

On the right-hand-side, we now sum over all sellers s E S, and for each seller, we defied its reservation price $R_s$ by (1−C) to account for the commission, as before. Then we multiply this "corrected" reservation price with the total amount of bandwidth reserved at an access point that belongs to the seller. For this, we introduce the new variable $r_{ijsk}$ which denotes the sum of the reservations for buyer i in sector j at all access points belonging to seller s. See line (11) where these variables are set.

Line (10): This line handles the "average" reservation prices for the MVNOs. As before, the left-hand-side is the value generated for the MVNOs, and it is the same as the second term in the objective function. The right-hand-side is the same as in the line above, except that we do not sum over all time slots k E K, because the MVNOs do not have combinatorial constraints that span multiple timeslots. For this reason, we instead have a separate constraint for every timeslot, because it is okay if the constraints only hold individually, per timeslot.

Line (11): In this line we set the new reservation variables $r_{ijsk}$ that capture how much bandwidth we reserve at any of seller s's access points for a buyer i in sector j for time slot k, to be equal to the sum of the per-AP-reservations $r_{ijak}$. For this, we need to sum over all APs in the set A(s), i.e., the set of all access points that belong to seller s.

Pricing Mechanism for Short-Term Market

For the short-term market, we also use MIP 1 to compute the reservations. The only difference is that now the MNOs do not have combinatorial preferences. However, the result of solving MIP 1 is still a set of reservations.

To price the reservations of the short-term market, we will use the VCG (Vickrey-Clarke-Groves) mechanism. In particular, we will compute one price per buyer per day to be paid to the market operator.

The algorithmic process of computing the VCG prices per buyer involves solving the MIP 1 once including all buyers, and then again n more times, where n corresponds to the number of winning buyers. The payment of buyer i is then the difference in value accrued to all others buyers in the solution that includes buyer i and their value in the solution that does not include buyer i.

We subtract the commission fee from the buyer's VCG payment, and the remaining amount of money is paid to the sellers who owned any of the access points via which the buyer offloaded some of its data. The amount of money is split up accordingly to the contribution each seller made (i.e., the amount of traffic from this buyer that went through its AP relative to the total amount of traffic).

Pricing Mechanism for Long-Term Market

To price the reservations that result from solving MIP 1, we use core-selecting combinatorial auctions with reserve prices. That means that we compute one price for each buyer, and the prices lie in the so-called "core" which means that none of the losing bidders would be willing to pay more for the resources than what the winning bidders are paying. We will use the VCG payment vector (computed as described above) as the reference price vector in computing core payments, and we will minimize the Euclidian distance to the VCG price vector to determine the final payments. Based on the buyers' payments, the commission fee and the payments to the sellers are calculated in the same way as described in the short-term market design.

To make the computation of the core payments computationally feasible, we will use a core constraint generation method, which iteratively adds new core constraints to the price finding algorithm until no more core constraints are violated, i.e., until prices are high enough such that all prices are in the core.

Figure 3:
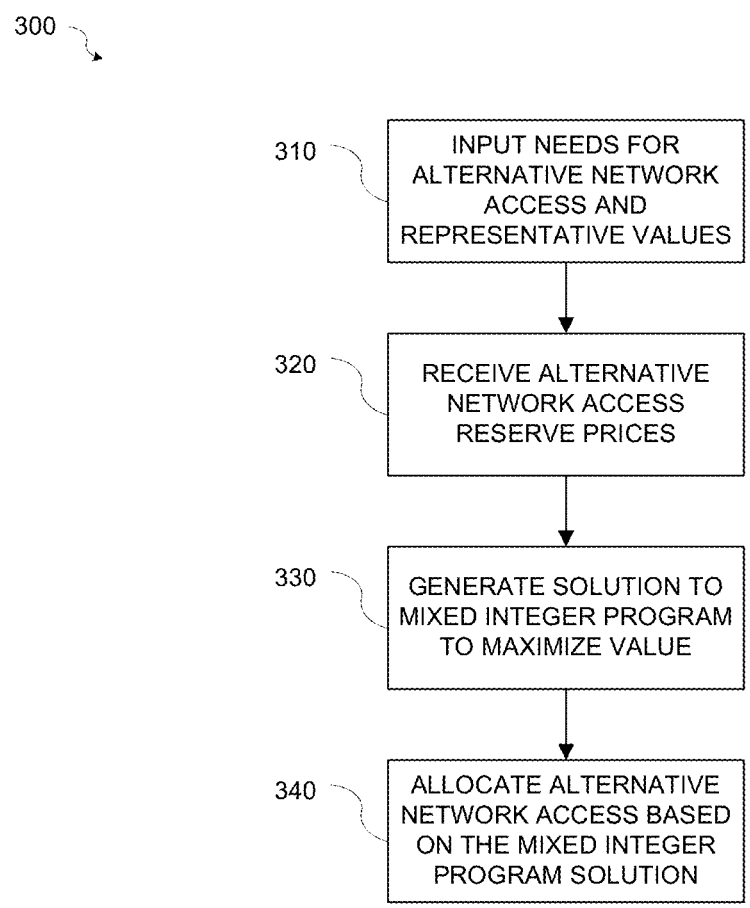
FIG. 3 is a flowchart illustrating a method according to various embodiments.

FIG. 3 is a flowchart illustrating a method according to various embodiments. Referring to FIG. 3, one or more parties may input needs for alternative network access and representative values for satisfying the needs (310). The parties may receive from providers of alternative network access reserve prices for access to each access point in the alternative network (320). A solution based on a mixed integer program may be generated to maximize value created by allocation of alternative network access (330). Alternative network access may be allocated to the one or more parties based on the mixed integer program solution (340).

The foregoing systems and methods and associated devices and modules are susceptible to many variations. Additionally, for clarity and concision, many descriptions of the systems and methods have been simplified. For example, the figures generally illustrate one of each type of network device, but a network system may have many of each type of device.

As described in this specification, various systems and methods are described as working to optimize particular parameters, functions, or operations. This use of the term optimize does not necessarily mean optimize in an abstract theoretical or global sense. Rather, the systems and methods may work to improve performance using algorithms that are expected to improve performance in at least many common cases. For example, the systems and methods may work to optimize performance judged by particular functions or criteria. Similar terms like minimize or maximize are used in a like manner.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a multi-core processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art.

What is claimed is:

1. A method comprising, by at least one hardware processor:
    receiving, from each of one or more parties, an offloading demand for access to an alternative network and a value of the offloading demand to the party;
    receiving, from each of a plurality of providers of access to the alternative network, a reserve price for access to one or more access points in the alternative network that are provided by the provider, wherein the reserve price is a minimum price that must be met on average across all of the one or more access points provided by that provider; and,
    for each of one or more sectors and each of one or more time slots,
        allocating at least one access point in the alternative network, in the sector and for the time slot, to at least one of the one or more parties based on the received values of the offloading demands and the received reserve prices, and,
        during the time slot, offloading one or more mobile devices, that are communicatively connected to a primary network of the at least one party within the sector, to the allocated at least one access point in the alternative network.

2. The method of claim 1, wherein each offloading demand indicates at least one of the one or more sectors in association with at least one of the one or more time slots, and wherein each allocation of an access point to one of the one or more parties is for an access point within the at least one sector, indicated in the offloading demand received from that one party, during the at least one time slot associated with that at least one sector in the offloading demand received from that one party.

3. The method of claim 1, further comprising, by the at least one hardware processor, determining all allocations by maximizing a value function associated with each of the one or more parties, wherein the value function associated with each of the one or more parties uses the received value of the offloading demand to that party.

4. The method of claim 3, wherein the one or more parties comprise both one or more mobile network operators and one or more mobile virtual network operators, and wherein the value function associated with each of the one or more mobile network operators is different than the value function associated with each of the one or more mobile virtual network operators.

5. The method of claim 1, wherein the primary network comprises a wireless cellular network, and wherein the alternative network comprises a Wi-Fi™ network.

6. The method of claim 1, wherein network topologies of the primary network and the alternative network are different.

7. The method of claim 1, wherein the allocation is performed for both short-term time slots and long-term time slots, and wherein access to the alternative network is allocated differently for a short-term time slot than for a long-term time slot.

8. The method of claim 7, further comprising computing prices for each short-term time slot using a Vickrey-Clarke-Groves (VCG) mechanism.

9. The method of claim 7, further comprising computing prices for each long-term time slot with core-selecting combinatorial auctions.

10. The method of claim 1, wherein allocation for all of the one or more sectors and all of the one or more time slots is performed once a day.

11. The method of claim 1, wherein each of the one or more time slots is one-hour long.

12. The method of claim 1, wherein the one or more sectors comprise a plurality of sectors.

13. The method of claim 1, wherein the one or more time slots comprise a plurality of time slots.

14. A non-transitory computer-readable medium having instructions stored thereon, wherein the instructions, when executed by a processor, cause the processor to:

receive, from each of one or more parties, an offloading demand for access to an alternative network and a value of the offloading demand to the party;

receive, from each of a plurality of providers of access to the alternative network, a reserve price for access to one or more access points in the alternative network that are provided by the provider, wherein the reserve price is a minimum price that must be met on average across all of the one or more access points provided by that provider; and, for each of one or more sectors and each of one or more time slots, allocate at least one access point in the alternative network, in the sector and for the time slot, to at least one of the one or more parties based on the received values of the offloading demands and the received reserve prices, and, during the time slot, offload one or more mobile devices, that are communicatively connected to a primary network of the at least one party within the sector, to the allocated at least one access point in the alternative network.

15. A system comprising:

at least one hardware processor; and one or more software modules configured to, when executed by the at least one hardware processor, receive, from each of one or more parties, an offloading demand for access to an alternative network and a value of the offloading demand to the party, receive, from each of a plurality of providers of access to the alternative network, a reserve price for access to one or more access points in the alternative network that are provided by the provider, wherein the reserve price is a minimum price that must be met on average across all of the one or more access points provided by that provider, and, for each of one or more sectors and each of one or more time slots, allocate at least one access point in the alternative network, in the sector and for the time slot, to at least one of the one or more parties based on the received values of the offloading demands and the received reserve prices, and, during the time slot, offload one or more mobile devices, that are communicatively connected to a primary network of the at least one party within the sector, to the allocated at least one access point in the alternative network.

\* \* \* \* \*